US009322919B2

(12) United States Patent
Iwasaki et al.

(10) Patent No.: US 9,322,919 B2
(45) Date of Patent: Apr. 26, 2016

(54) SATELLITE BASED AUGMENTATION SYSTEM AND SATELLITE BASED AUGMENTATION METHOD

(75) Inventors: Ryuichiro Iwasaki, Tokyo (JP); Yutaka Nozaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 557 days.

(21) Appl. No.: 13/813,821

(22) PCT Filed: Aug. 26, 2011

(86) PCT No.: PCT/JP2011/069970
§ 371 (c)(1),
(2), (4) Date: Feb. 1, 2013

(87) PCT Pub. No.: WO2012/035992
PCT Pub. Date: Mar. 22, 2012

(65) Prior Publication Data
US 2013/0127661 A1     May 23, 2013

(30) Foreign Application Priority Data

Sep. 13, 2010 (JP) .................................. 2010-204289

(51) Int. Cl.
*G01S 19/08* (2010.01)
(52) U.S. Cl.
CPC ...................... *G01S 19/08* (2013.01)
(58) Field of Classification Search
CPC .......... G01S 19/08; G01S 19/20; G01S 19/23
USPC .............. 342/357.24, 357.4, 357.45, 357.58; 701/468, 470, 518
See application file for complete search history.

(56) References Cited

U.S. PATENT DOCUMENTS

| 2004/0061643 A1 | 4/2004 | Brenner |
| 2004/0078140 A1 | 4/2004 | Rowitch et al. |
| 2007/0268177 A1 | 11/2007 | Ahmed et al. |
| 2011/0025558 A1 | 2/2011 | Levy |

FOREIGN PATENT DOCUMENTS

| CN | 1705895 A | 12/2005 |
| EP | 1729145 B1 | 8/2013 |
| JP | 2003-139843 A | 5/2003 |
| JP | 2005-249653 A | 9/2005 |
| JP | 3748805 B2 | 12/2005 |
| JP | 2006-504097 A | 2/2006 |

(Continued)

OTHER PUBLICATIONS

Communication dated Jul. 4, 2014, issued by the European Patent Office in counterpart European application No. 11824998.6.
Gang Xie et al., "Integrity Design and Updated Test Results for the Stanford LAAS Integrity Monitor Testbed", Jun. 13, 2001, pp. 681-693, XP056006137, section 3.1, http://www.ion.org/publications/abstract.cfm?articleID=908.

(Continued)

*Primary Examiner* — Dao Phan
(74) *Attorney, Agent, or Firm* — Sughrue Mion, PLLC (57) ABSTRACT

Provided is a satellite based augmentation system comprising: a threshold value calculation unit which calculates a monitoring threshold value for determining whether or not a value of carrier to noise power density ratio (C/No) at a time when a pseudorange is measured on the basis of a signal from a GPS satellite is proper; and a pseudorange determination unit which determines whether or not the pseudorange has proper accuracy by comparing the C/No value and the monitoring threshold value.

6 Claims, 5 Drawing Sheets

(56) References Cited

FOREIGN PATENT DOCUMENTS

| JP | 2008-145274 | A  | 6/2008  |
| JP | 2009-537849 | A  | 10/2009 |
| JP | 4348453     | B2 | 10/2009 |
| JP | 2011-517770 | A  | 6/2011  |
| KR | 10-2005-0055030 | A | 6/2005 |
| WO | 2006/132003 | A1 | 12/2006 |
| WO | 2009/112483 | A1 | 9/2009  |

OTHER PUBLICATIONS

Office Action, dated Feb. 26, 2014, issued by the Korean Intellectual Property Office, in counterpart Application No. 10-2013-7006322.

Communication dated Mar. 17, 2014, issued by the State Intellectual Property Office of the People's Republic of China in corresponding Application No. 201180043846.8.

Office Action, dated Apr. 2, 2013, issued by the Japanese Patent Office in counterpart Japanese Patent Application No. 2010-204289.

| C/No VALUE M [dB-Hz] | FREQUENCY |
|---|---|
| 59 ≦ M < 60 | 750 |
| 58 ≦ M < 59 | 1000 |
| 34 ≦ M < 35 | 5000 |
| 33 ≦ M < 34 | 5000 |
| 32 ≦ M < 33 | 4000 |
| 31 ≦ M < 32 | 1000 |
| < 31 | 200 |

Fig.4

| C/No VALUE M [dB−Hz] | FREQUENCY |
|---|---|
| 59.5 ≦M< 60.0 | 250 |
| 59.0 ≦M< 59.5 | 500 |
| ≦M< | |
| 34.5 ≦M< 35.0 | 2500 |
| 34.0 ≦M< 34.5 | 2500 |
| 33.5 ≦M< 34.0 | 2500 |
| 33.0 ≦M< 33.5 | 2500 |
| 32.5 ≦M< 33.0 | 2000 |
| 32.0 ≦M< 32.5 | 2000 |
| 31.5 ≦M< 32.0 | 500 |
| 31.0 ≦M< 31.5 | 500 |
| 30.5 ≦M< 31.0 | 20 |
| 30.0 ≦M< 30.5 | 20 |
| 29.5 ≦M< 30.0 | 20 |
| 29.0 ≦M< 29.5 | 20 |
| 28.5 ≦M< 29.0 | 20 |
| 28.0 ≦M< 28.5 | 20 |
| 27.5 ≦M< 28.0 | 20 |
| 27.0 ≦M< 27.5 | 20 |
| ≦M< | |
| 20.0 ≦M< 20.5 | 0 |

Fig.5

SATELLITE BASED AUGMENTATION SYSTEM AND SATELLITE BASED AUGMENTATION METHOD

CROSS REFERENCE TO RELATED APPLICATIONS

This application is a National Stage of International Application No. PCT/JP2011/069970 filed Aug. 26, 2011, claiming priority based on Japanese Patent Application No. 2010-204289, filed Sep. 13, 2010, the contents of all of which are incorporated herein by reference in their entirety.

TECHNICAL FIELD

The present invention relates to a satellite based augmentation system and a Satellite based augmentation method that use only high-reliability GPS positioning signals among signals from GPS satellites.

BACKGROUND ART

In a global positioning system such as the GPS (Global Positioning System) or the like, defining as a pseudorange a value obtained at a user's GPS receiver by multiplying the difference between a time of transmission of a signal such as a ranging signal (L1C/A), which is a GPS positioning signal from a GPS satellite, and a time of reception of the signal at a receiving station (monitoring point) by the speed of light, a position of the receiving station is measured on the basis of the pseudorange.

Accuracy of the pseudorange is degraded when C/No (carrier to noise power density ratio) decreases because of power reduction of the ranging signal, a clock error, an error due to the ionosphere, that due to the troposphere, noise due to multiple paths or the like, trouble of the GPS receiver itself and the like. In cases accuracy of the pseudorange is degraded, a user incorrectly determines his/her own position. Accordingly, self-position determination based on a low-accuracy pseudorange results in dangerous information for a high-speed mobile object such as an airplane.

In this respect, in usual global positioning systems, in order to remove noise due to multiple paths or the like from a measured pseudorange, smoothing processing is performed on the pseudorange. However, because such real time smoothing processing is simple one, its accuracy cannot be said to be high, and thus some portion of the noise may remain, and accordingly, there may be cases where the positioning accuracy is finally decreased.

In this respect, Japanese Patent Application Laid-Open No. 2005-249653 discloses a pseudorange evaluation system comprising a data processing device which, when an abnormal value is detected in pseudorange values after real time smoothing processing used for positioning computation, determines whether or not a pseudorange value after post-process smoothing processing measured at the same monitoring time as that of the abnormal value is normal value.

If it is found that the pseudorange was determined to be an absolute value in spite of its being a normal value, owing to the real time smoothing processing, this data processing device determines that the cause of the abnormal value detection is residual noise due to a limit of the real time smoothing processing. By this way, the cause of a decrease in pseudorange accuracy can be recognized.

Alternatively, International Publication No. WO2006-132003 discloses a GPS receiver device comprising a position correction data calculation means which calculates the position of a base station on the basis of satellite signals and thus calculates data for position correction indicating a deviation of the calculated position from the absolute position of the station, and a base station receiving-intensity measurement means which measures receiving intensity of the satellite signals at the base station.

This base station transmits to a mobile station the data for position correction calculated by the position correction data calculation means and the receiving intensity of the satellite signals measured by the base station receiving-intensity measurement means. The mobile station compares the receiving intensity of the satellite signals at the base station, measured by the base station receiving-intensity measurement means, with receiving intensity of the satellite signals at the mobile station (own station) measured by itself. By this way, recognition of a satellite signal influenced by multiple paths and correction of a measured position of a mobile station was made possible.

DISCLOSURE OF INVENTION

While, as described above, determination of a self-position based on a low-accuracy pseudorange could rather lead to a dangerous situation, above-described Japanese Patent Application Laid-Open No. 2005-249653 and International Publication No. WO2006-132003 have a problem of no consideration about reliability of the ranging signal from a GPS satellite itself, which is the base of the pseudorange. Accordingly, even if various processings are performed, self-position determination cannot be performed correctly when the reliability of a base signal is low.

In this respect, the primary objective of the present invention is to provide a satellite based augmentation system and a satellite based augmentation method, which reinforce GPS satellite navigation with respect to a high-speed mobile object such as an airplane, by performing position calculation using only GPS signals giving a highly accurate pseudorange, by the use of a device equipped with a signal monitoring program capable of properly determining the reliability of a received signal from a GPS satellite.

Solution to Problem

A satellite based augmentation system according to the present invention is characterized by its comprising a threshold value calculation unit which calculates a monitoring threshold value for determining whether or not a value of carrier to noise power density ratio (C/No) of when a pseudorange is measured on the basis of a signal from a GPS satellite is proper, and a pseudorange determination unit which, by comparing a C/No value with the monitoring threshold value, determines whether or not a pseudorange is of proper accuracy.

Advantageous Effect of Invention

According to the present invention, a GPS receiver used by a user becomes able to properly determine the reliability of a signal from a GPS satellite, and thus accuracy and reliability of self-position determination using GPS satellites are improved.

DESCRIPTION OF EMBODIMENT

Figure 1:
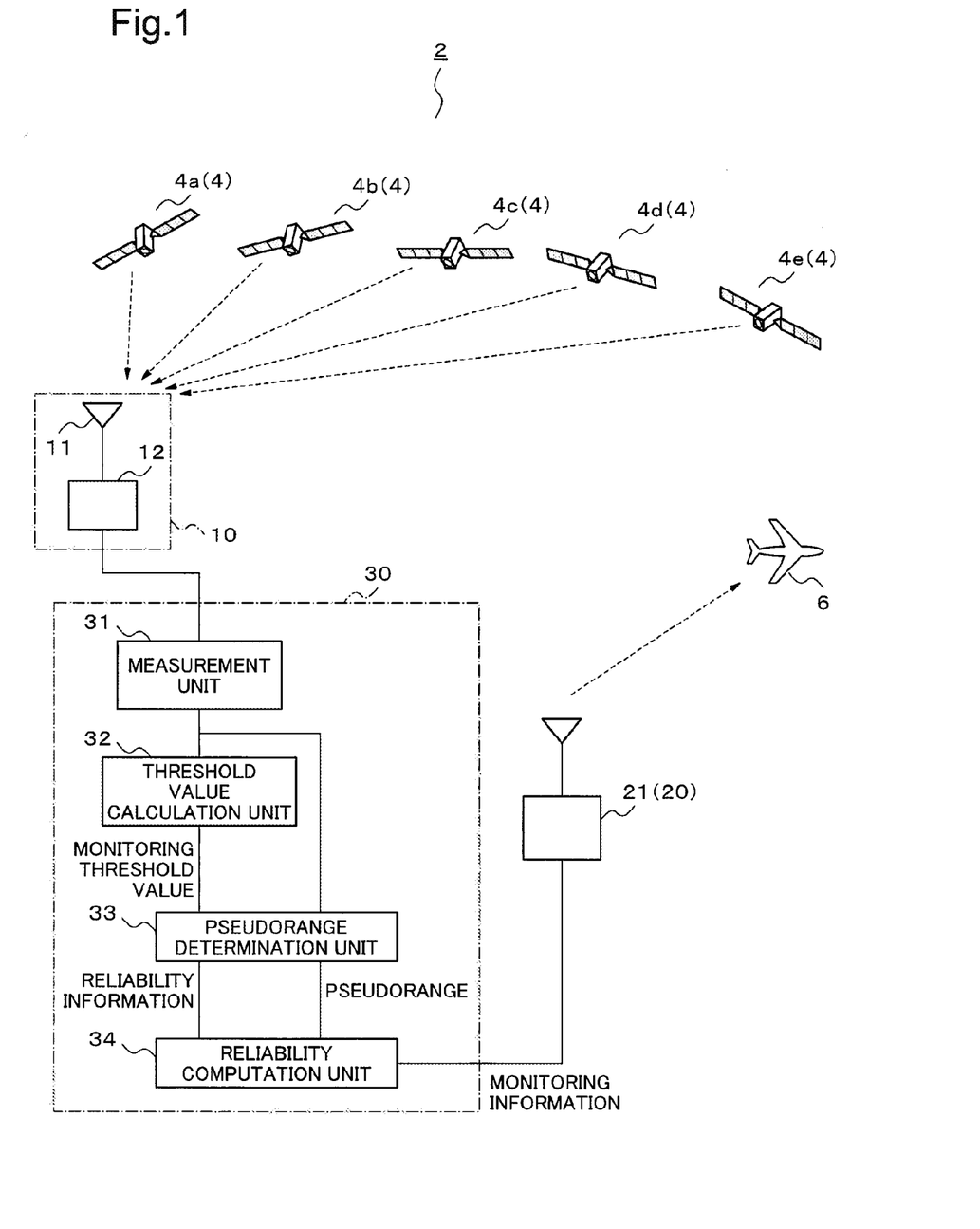
FIG. 1 is a block diagram of a satellite based augmentation system according to a first exemplary embodiment of the present invention.

An exemplary embodiment of the present invention will be described below. FIG. 1 is a block diagram of a satellite based augmentation system 2 according to a first exemplary embodiment. The satellite based augmentation system 2 comprises a base station 10 which receives signals from GPS satellites 4 (4a to 4e), a signal monitoring device 30 which measures ranging information on the basis of a signal from the base station 10 and outputs a result of determining the properness of the ranging information as reliability information, and an information output device 20 which outputs the reliability information from the signal monitoring device 30 to a ranging information utilization apparatus 6 such as an airplane.

Here, the ranging information includes a pseudorange, a C/No (carrier to noise power density ratio) value, a time of their measurement and the like. This pseudorange is a value obtained by multiplying the difference between a time of transmission of a signal such as a ranging signal (L1C/A) from a positioning satellite and a time of reception of the signal at a base station by the speed of light. The C/No value is a value of carrier to noise power density ratio at the time of acquiring the pseudorange.

The base station 10 includes a receiving antenna 11 and a receiver 12 for receiving a signal from each of the GPS satellites 4. The information output device 20 includes a transmission antenna 21 which outputs the reliability information from the signal monitoring device 30 to the ranging information utilization apparatus 6 such as an airplane.

The signal monitoring device 30 includes a measurement unit 31, a threshold value calculation unit 32, a pseudorange determination unit 33 and a reliability computation unit 34. Here, the measurement unit 31 may be installed in the receiver 12 at the base station 10.

The measurement unit 31 measures a pseudorange value and a C/No value at predetermined measurement time intervals, on the basis of a ranging signal (L1C/A) included in a signal received by the base station 10. Then, the pseudorange and C/No value are stored, along with the time of their measurement, in a storage unit not illustrated in the diagram. A value of 0.5 seconds may be suggested as an example of the predetermined measurement time interval.

The threshold value calculation unit 32 calculates a monitoring threshold value, which is used at a time of determining whether or not the pseudorange value measured by the measurement unit 31 is proper, on the basis of the C/No value measured by the measurement unit 31.

On the basis of the monitoring threshold value, the pseudorange determination unit 33 determines whether or not the pseudorange value is proper, in terms of each of the GPS satellites 4. On the basis of the determination result by the pseudorange determination unit 33, the reliability computation unit 34 computes reliability information. This reliability information, along with the pseudorange value, is outputted as monitoring information to the information output device 20.

The information output device 20 comprises the transmission antenna 21, such as a VHF data broadcasting equipment antenna, which outputs the monitoring information from the signal monitoring device 30 to the ranging information utilization apparatus 6 such as an airplane. Because, by this way, on the basis of the monitoring information, the ranging information utilization apparatus 6 such as an airplane becomes able to determine its self-position or the like according to only ones of the GPS satellites 4 which were determined to be proper, the self-position determination can become correct.

Figure 2:
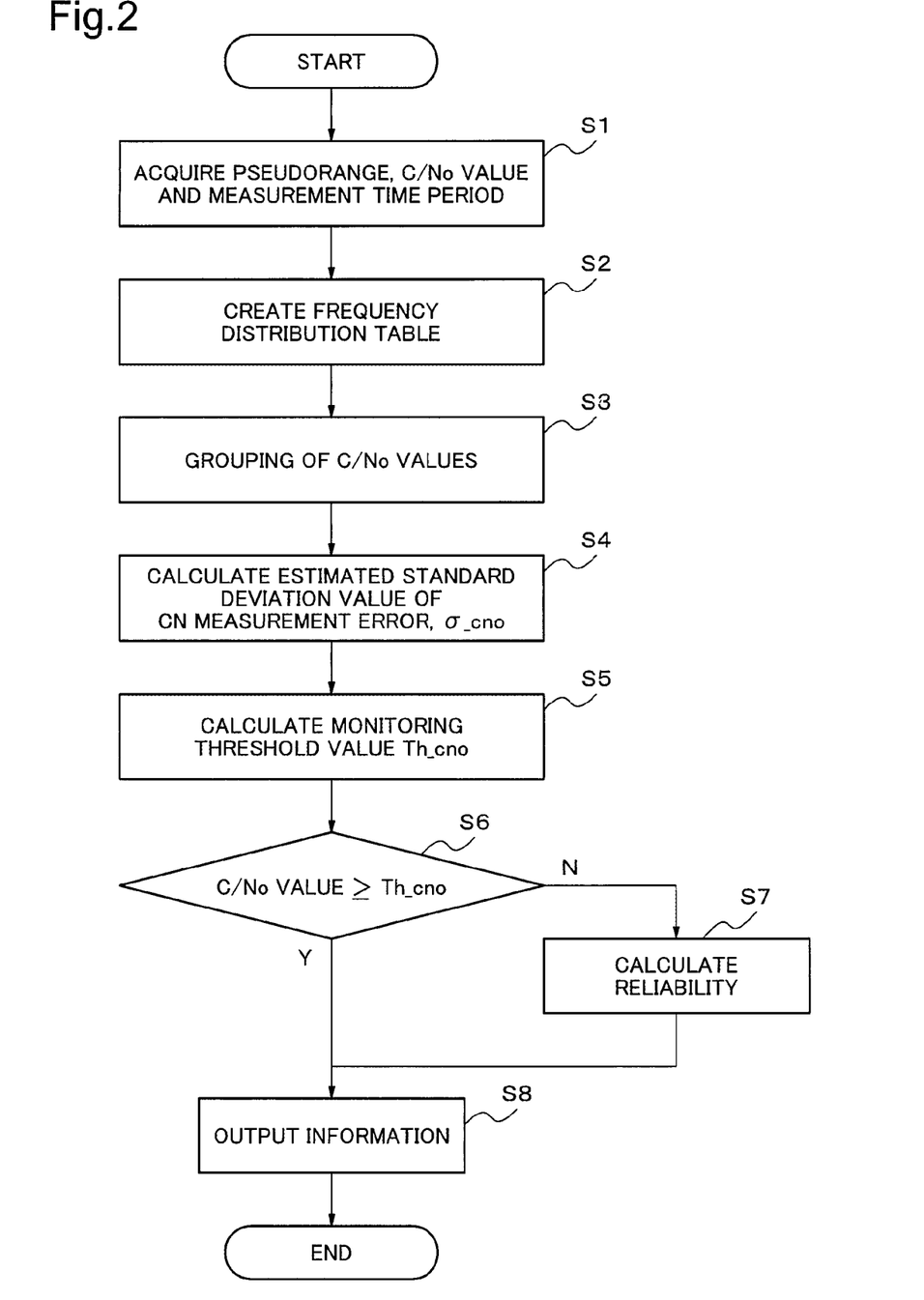
FIG. 2 is a flow chart showing a calculation procedure of a monitoring threshold value according to the first exemplary embodiment.

Thus, the monitoring threshold value is an important value for determining the accuracy of a pseudorange. FIG. 2 is a flow chart showing a calculation procedure of the monitor threshold value.

Monitoring information outputted by the satellite based augmentation system 2 is required to be of a higher accuracy than a predetermined one (hereafter, referred to as a minimum desired accuracy). Of course, the accuracy is preferred to be as high as possible, but in order to achieve higher accuracy, the use of expensive hardware and the like becomes necessary, and a load of various sorts of data processing becomes large. Therefore, an acceptable accuracy range is set here.

Since monitoring information is created on the basis of a C/No value, a C/No value range corresponding to an accuracy range of monitoring information is defined. The upper limit of this C/No value range is expressed as a CN range upper-limit value CN_max, and the lower limit as a CN range lower-limit value CN_min.

Further, the probability of a situation where the properness of a pseudorange cannot be determined owing to the measurement error in a corresponding C/No value being smaller than the monitoring threshold value (missed detection) is expressed as a missed-detection probability P_md. Additionally, the probability of a situation where a pseudorange is determined to be improper, in spite of its satisfying an accuracy required of it, owing to the measurement error in a corresponding C/No value being smaller than the monitoring threshold value (false alarm) is expressed as a false alarm probability P_fa. These C/No value range, missed-detection probability P_md and false alarm probability P_fa are registered by a user or a system constructor in advance in the threshold value calculation unit 32.

Under such settings, the measurement unit 31 measures pseudoranges and C/No values from ranging signals (L1C/A) at predetermined intervals over a predetermined time period (Step S1). The measured pseudoranges and C/No values, along with the time of their measurement, are stored in a storage unit not illustrated in the diagram. Hereafter, the above-described predetermined time period during which the measurements are carried out is expressed as a measurement time period, and the predetermined interval as a sampling time.

A time of 0.1-1 second may be suggested as an example of the sampling time. For example, if the measurement time period is 3 months, the sampling time is 0.5 seconds, and the number of GPS satellites whose signals are received is eight, then the number of measurements is calculated as approximately $1.24 \times 10^8$ (=3 [months]$\times$30 [days]$\times$24 [h]$\times$3600 [s]$\times$(1/0.5 [s])$\times$8 [satellites]).

Figure 3:
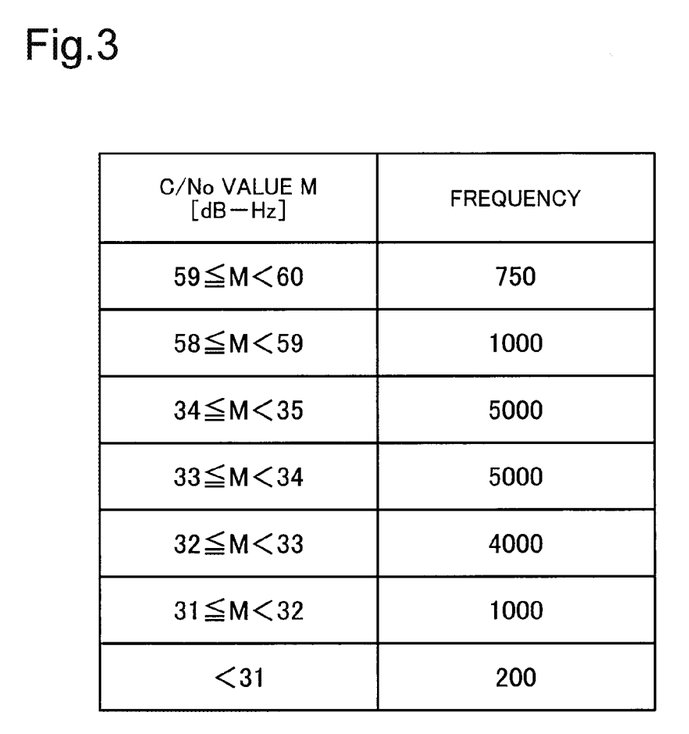
FIG. 3 is a frequency distribution table of C/No values divided by seven bins according to the first exemplary embodiment.

In the next step, the threshold value calculation unit 32 creates a frequency distribution table (histogram) of the stored C/No values (Step S2). At that time, when the interval of a frequency distribution table is 1 [dB-Hz] and the value range the C/No values M may take is 20 [dB-Hz]-60 [dB-Hz], for example, it results that the frequency distribution table is divided into forty bins. That is, in the frequency distribution table, bin 1 becomes 20 [dB-Hz]<M≤21 [dB-Hz], bin 2 becomes 21 [dB-Hz]<M≤22 [dB-Hz], . . . , bin 39 becomes 58 [dB-Hz]<M≤59 [dB-Hz] and bin 40 becomes 59 [dB-Hz] <M≤60 [dB-Hz]. FIG. 3 shows an example of a frequency distribution table of C/No values divided by seven bins.

With respect to a frequency distribution table such as shown in FIG. 3, if the frequency of C/No values smaller than CN_min is expressed by N_min and the total frequency by Nt, the probability of C/No values M being smaller than the CN range lower-limit value CN_min (lower-limit probability), expressed by P_CN_min, is calculated according to an equation (1).

$$P\_CN\_min = \frac{\left(\begin{array}{c}\text{frequency of } C/No \text{ values}\\ \text{being smaller than CN\_mi}\end{array}\right)}{\text{(total frequency)}} \quad (1)$$
$$= N\_min/Nt$$

Figure 4:
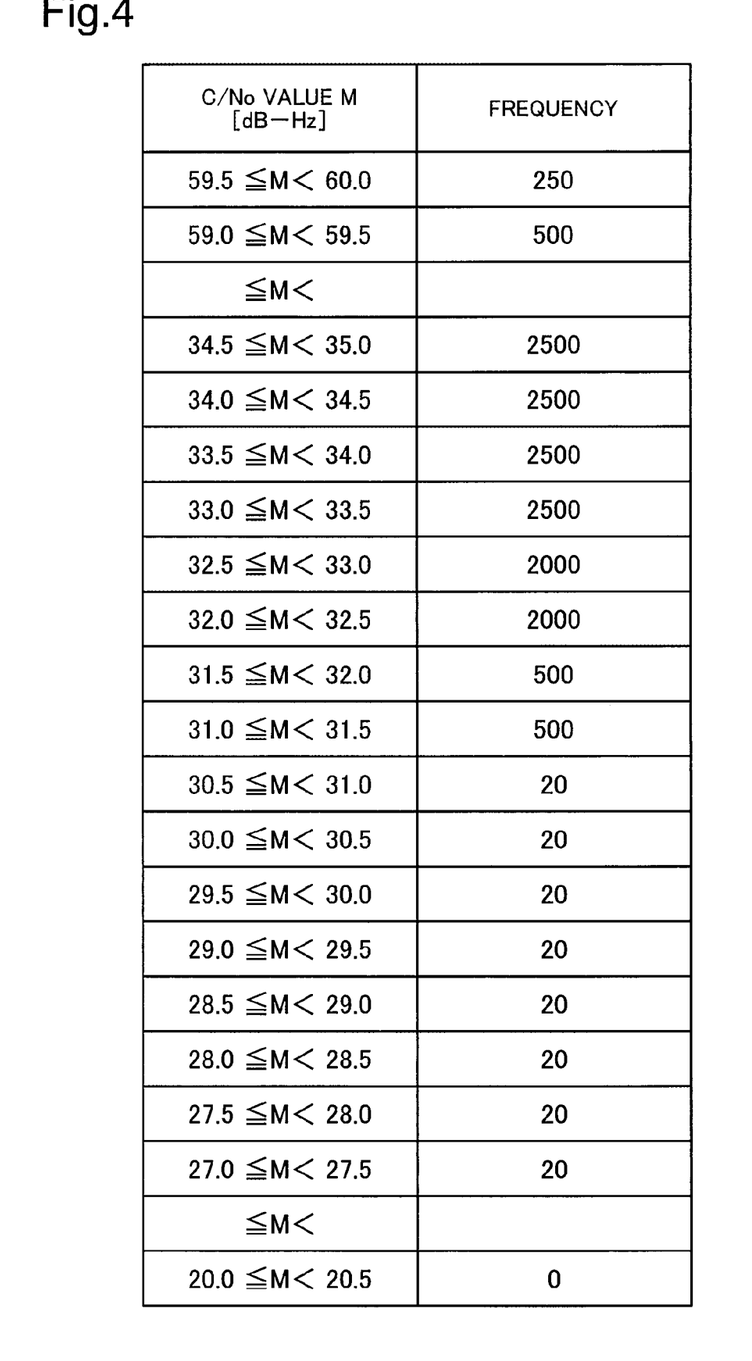
FIG. 4 is a frequency distribution table of C/No values divided by an increased number of bins according to the first exemplary embodiment.

Here, in the equation (1), the lower-limit probability P_CN_min is given as the probability of the frequency of C/No values M being smaller than CN_min. However, when an estimated standard deviation value σ_cno of measurement errors in the C/No values is sufficiently smaller than the measurement range of C/N values (for example, about 20 [dB-Hz]-60 [dB-Hz]), it is possible to improve accuracy of the lower-limit probability by increasing the number of bins as shown, for example, in FIG. 4. In this case, the lower-limit probability P_CN_min in the equation (1) is changed to that in an equation (2).

$$P\_CN\_min = \text{(frequency of } C/No \text{ values being within a range } CN\_min \pm 3\sigma\_cno\text{)/(total frequency)} \quad (2)$$

Here, supposing that the frequency of C/No values being within a range CN_min±3σ_cno relates to missed-detection or false alarms, as the frequency of this range, a total of the frequencies of the ranges 29.5 [dB-Hz]≤M<30.0 [dB-Hz] to 32.0 [dB-Hz]≤M<32.5 [dB-Hz] in FIG. 4 can be employed.

The estimated standard deviation value σ_cno of measurement errors in C/No values is obtained by the following method. Firstly performed is grouping which puts two C/No values nearest to each other in terms of measurement time, among measured C/No values, into a group (Step S3). For example, if the C/No value at a certain time t is represented by CN(t), two C/No values nearest to each other become CN(t) and CN(t+Δt). Here, Δt is the sampling time.

Then, the difference between CN(t) and CN(t+Δt) is defined as an estimated CN measurement error value ΔCN(t) (=CN(t)−CN (t+Δt)). This estimated CN measurement error value ΔCN(t) is calculated to the number of sampling points, and a sample standard deviation is calculated from a distribution of the ΔCN(t) values. A value obtained by dividing this sample standard deviation by 20.5 is the estimated standard deviation value σ_cno of measurement errors in C/No values (Step S4). The reason of dividing the sample standard deviation by 20.5 is to transform it to a standard deviation corresponding to single C/No value, on the basis of the additivity of normal distribution, since the ΔCN(t) values were each obtained as a difference between two C/No values.

Figure 5:
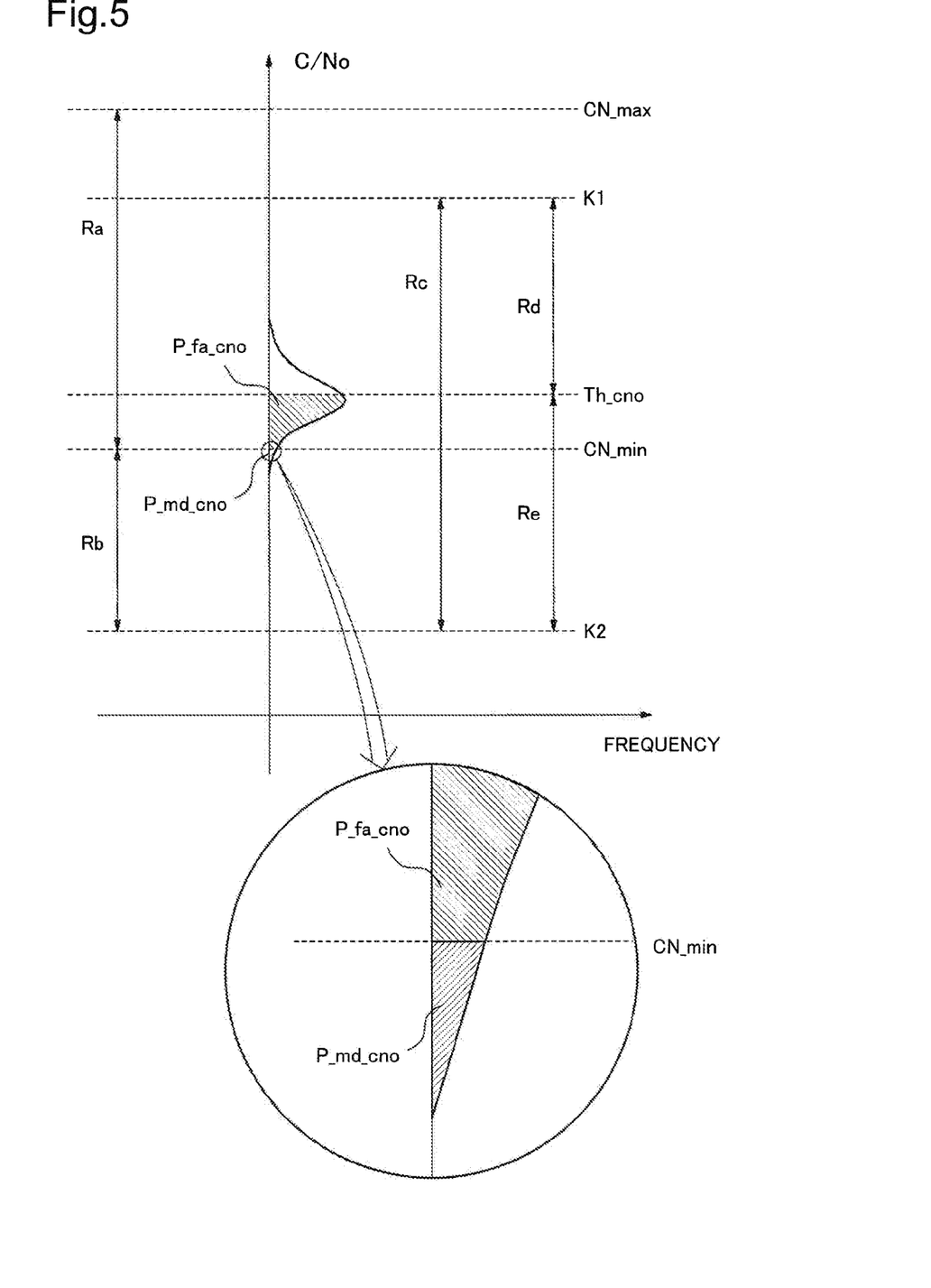
FIG. 5 is a diagram showing a frequency distribution of measurement errors in C/No values according to the first exemplary embodiment.

Next, a monitoring threshold value is calculated (Step S5). FIG. 5 is a diagram showing a frequency distribution of measurement errors in C/No values. In FIG. 5, a tail portion of the frequency distribution is shown in an enlarged view. In the diagram, CN_max represents a CN range upper-limit value, CN_min a CN range lower-limit value, Th_cno a monitoring threshold value, P_md_cno a missed-detection probability, and P_fa_cno a false alarm probability. Also in FIG. 5, a dotted line K1 is a line indicating a result of predetermined attenuation processing or the like performed to fit ranging signals received at the base station 10 into the measurement range of the measurement unit 31. That is, the attenuation processing is performed on signals inputted to the measurement unit 31 so as to make them smaller than the CN range upper-limit value. On the other hand, a dotted line K2 indicates the minimum level of ranging signals.

Also in FIG. 5, a region Ra indicates a region where C/No values are between the CN range upper-limit value CN_max and the CN range lower-limit value CN_min, and a required pseudorange accuracy is satisfied. A region Rb indicates a region where C/No values are smaller than the CN range lower-limit value CN_min, but the required pseudorange accuracy is not satisfied. A region Re indicates a region of C/No values of all ranging signals possibly received actually. A region Rd indicates a region where C/No values, among those of all ranging signals possibly received actually, are larger than the monitoring threshold value Th_cno, and the required pseudorange accuracy is satisfied. A region Re indicates a region where C/No values, among those of all ranging signals possibly received actually, are smaller than the monitoring threshold value Th_cno, and the required pseudorange accuracy is not satisfied.

Using the missed-detection probability P_md, the false alarm probability P_fa required for CN monitoring and the lower-limit probability P_CN_min calculated by the equation (2), a monitoring threshold value Th is calculated to satisfy equation (3) to equation (5).

$$P\_md\_cno + P\_fa\_cno = P\_CN\_min \quad (3)$$

$$P\_md\_cno \times P\_CN\_min \leq P\_md \quad (4)$$

$$P\_fa\_cno \times P\_CN\_min \leq P\_fa \quad (5)$$

For example, it is supposed that, from a frequency distribution table of C/No values shown in FIG. 4, the frequency in the range CN_min±3σ_cno is found to be $2 \times 10^2$, and the total frequency be $1.24 \times 10^8$. Also supposed is that the missed-detection probability P_md is set at $1 \times 10^{-6}$ and the false alarm probability P_fa at $1 \times 10^{-4}$. Then, the lower-limit probability P_CN_min is calculated as P_CN_min=$(2 \times 10^2)/(1.24 \times 10^8) = 1.6 \times 10^{-6}$.

As a result, the equations (4) and (5) can be changed to the following equations (4') and (5'), respectively.

$$P\_md\_cno \times 1.6 \times 10^{-6} \leq 1 \times 10^{-6} \quad (4')$$

$$P\_fa\_cno \times 1.6 \times 10^{-6} \leq 1 \times 10^{-4} \quad (5')$$

Respective ranges of the missed-detection probability P_md_cno and the false alarm probability P_fa_cno are found from these equations (4') and (5'), respectively, and the monitoring threshold value Th_cno is calculated in a manner to make these ranges satisfy the equation (3).

It is supposed that the missed-detection probability P_md_cno=0.4, the false alarm probability P_fa_cno=0.1 and the lower-limit probability P_CN_min=0.5. Then, P_md_cno+P_fa_cno=0.5 in the equation (3). Accordingly, in the normal distribution with an estimated standard deviation value of CN measurement error, σ_cno, being 0.5 [dB-Hz], a position in the distribution for which the missed-detection probability P_md_cno corresponding to a region of smaller C/No values becomes 0.4 is adjusted to the lower-limit probability CN_min. At that time, a center position of the normal distribution with an estimated standard deviation value of CN measurement error, σ_cno, being 0.5 [dB-Hz] is determined to be the threshold C/No value Th_cno.

The thus computed monitoring threshold value Th_cno is outputted to the pseudorange determination unit 33. The pseudorange determination unit 33 performs comparison in magnitude between a C/No value and the monitoring threshold value Th_cno (Step S6). Pseudorange values are measured on the basis of respective ranging signals from the plurality of GPS satellites 4. Accordingly, for example, if a C/No value is smaller than the monitoring threshold value Th_cno, the result indicates that the pseudorange obtained on the basis of a signal from the one of the GPS satellites 4 which measured the C/No value is not of sufficient accuracy.

If a determination result by the pseudorange determination unit 33 is (C/No value)<(monitoring threshold value Th_cno), the process proceeds to Step S7, and if (C/No value) ≥(monitoring threshold value Th_cno), it proceeds to Step S8.

When the process is continued proceeding to Step S7, the reliability computation unit 34 computes the reliability of a pseudorange.

The reliability is calculated as follows. A pseudorange measured by the measurement unit 31 represents a position of the signal monitoring device 30. The signal monitoring device 30 of this kind is located at the base station 10 or the like whose position is defined in advance by a survey or the like. That is, the pseudorange measured by the measurement unit 31 represents a position of the base station 10 or the like.

Accordingly, the difference is calculated between a position of the signal monitoring device 30 calculated on the basis of a pseudorange and the position of the signal monitoring device 30 known in advance by a survey or the like, and the difference is determined to be the reliability. The reliability (position error) of this kind represents the error in a pseudorange measured on the basis of a signal from a GPS satellite with respect to which the condition (C/No value)<(monitoring threshold value) was found to exist. That is, it is indicated that there exists the above-mentioned position error if the ranging information utilization apparatus 6 such as an airplane performs ranging processing by the use of a signal from this GPS satellite. The reliability computation unit 34 outputs the reliability and the pseudorange to the information output device 20 as monitoring information (Step S8).

On the other hand, in the case the condition (C/No value) ≥(monitoring threshold value Th_cno) was determined to exist at Step S6, only the pseudorange is outputted to the information output device 20 as monitoring information (Step S8).

By this way, on the basis of the monitoring information from the information output device 20, the ranging information utilization apparatus such as an airplane can avoid determining its self-position on the basis a ranging signal from a GPS satellite of low accuracy. As a result, the ranging information utilization apparatus such as an airplane becomes able to navigate in safety.

This application insists on priority based on Japanese Patent Application No. 2010-204289 proposed on Sep. 13, 2010 and takes everything of the disclosure here.

Although the present invention has been described above, with reference to an exemplary embodiment (and examples), the present invention is not limited to the above-described exemplary embodiment (and examples). Various changes which are understood by those skilled in the art can be made in configurations and details of the present invention, within the scope of the present invention.

REFERENCE SIGNS LIST

2 satellite based augmentation system
10 base station
11 receiving antenna
12 receiver
20 information output device
21 transmission antenna
30 signal monitoring device
31 measurement unit
32 threshold value calculation unit
33 pseudorange determination unit
34 reliability computation unit

The invention claimed is:

1. A satellite based augmentation system comprising:
a threshold value calculation unit which calculates a monitor threshold value for determining whether or not a value of carrier to noise power density ratio (C/No) at a time when a pseudorange is measured on the basis of a signal from a GPS satellite is proper; and
a pseudorange determination unit which determines whether or not the pseudorange is of proper accuracy, by comparing the C/No value with the monitor threshold value;
wherein the satellite based augmentation system comprising a reliability computation unit which calculates and outputs reliability of the signal from the GPS satellite used for the measurement of the pseudorange when the pseudorange determination unit determined the C/No value to be smaller than the monitor threshold value;
wherein the threshold value calculation unit calculates a frequency distribution of the C/No values with respect to a plurality of measured the pseudoranges, and calculates the monitor threshold value the monitor threshold value that a probability $P\_CN\_min$ of the C/No value which takes frequency smaller than the monitor threshold value is equal to the sum of a missed-detection probability $P\_md\_cno$ and a false alarm probability $P\_fa\_cno$, wherein
the missed-detection probability $P\_md\_cno$ is a probability of situations where the properness of the pseudorange cannot be determined owing to the standard deviation of measurement errors in the C/No values in the frequency distribution being small than the monitor threshold value; and
the false alarm probability $P\_fa\_cno$ is a probability of situations where the pseudorange is determined to be improper, in spite of its satisfying an accuracy required of the pseudorange, owing to the standard deviation of measurement errors in the C/No values in the frequency distribution being smaller than the monitor threshold value.

2. The satellite based augmentation system according to claim 1, wherein:
the probability of the C/No value taking a smaller value than the monitor threshold value, $P\_CN\_min$, is given as $P\_CN\_min=N\_min/Nt$, wherein
the Nt is a total frequency of the frequency distribution of the C/No values; and
the N_min is a frequency of the C/No values in a permitted value range smaller than the monitor threshold value.

3. The satellite based augmentation system according to claim 1, wherein:
the probability $P\_CN\_min$ of the C/No value taking a smaller value than the monitor threshold value is given as $P\_CN\_min=N\_min\_cno/Nt$, wherein
the Nt is a total frequency of the frequency distribution of the C/No values;

the N_min_cno is a frequency of the C/No values within a range CN_min±3σ_cno among the C/No values in a permitted value range smaller than the monitor threshold value; and the σ_cno is an estimated standard deviation with respect to measurement errors in the C/No values.

4. The satellite based augmentation system according to claim 3, wherein the estimated standard deviation σ_cno of measurement errors in the C/No values is calculated on the basis of a standard deviation of a difference between two C/No values whose measurement times are adjacent to each other.

5. The satellite based augmentation system according to claim 1, wherein the reliability computation unit calculates the difference between a position of the satellite based augmentation system belongs which is calculated on the basis of the pseudorange and that measured in advance, as the reliability.

6. A satellite based augmentation method, comprising:
a threshold value calculation step of calculating a monitor threshold value for determining whether or not a value of carrier to noise power density ratio (C/No) at a time when a pseudorange is measured on the basis of a signal from a GPS satellite is proper; and
a pseudorange determination step of determining whether or not the pseudorange is of proper accuracy by comparing the C/No value and the monitor threshold value,
wherein the satellite based augmentation method comprising a reliability computation step of calculating and outputting reliability of the signal from the GPS satellite used for the measurement of the pseudorange when the C/No value is determined to be smaller than the monitor threshold value at the pseudorange determination step;
wherein the threshold value calculation step further comprises,
a step of calculating a frequency distribution of the C/No values with respect to a plurality of measured the pseudoranges, and of calculating the monitor threshold value the monitor threshold value that a probability P_CN_min of the C/No value which takes frequency smaller than the monitor threshold value is equal to the sum of a missed-detection probability P_md_cno and a false alarm probability P_fa_cno, wherein
the missed-detection probability P_md_cno is a probability of situations where the properness of the pseudorange cannot be determined owing to the standard deviation of measurement errors in the C/No values in the frequency distribution being smaller than the monitor threshold value; and
the false alarm probability P_fa_cno is a probability of situations where the pseudorange is determined to be improper, in spite of its satisfying an accuracy required of the pseudorange, owing to the standard deviation of measurement errors in the C/No values in the frequency distribution being smaller than the monitor threshold value.

* * * * *